US007088832B1

(12) United States Patent
Cooper

(10) Patent No.: US 7,088,832 B1
(45) Date of Patent: Aug. 8, 2006

(54) IFB SYSTEM APPARATUS AND METHOD

(76) Inventor: J. Carl Cooper, 73 Shoreline Cir., Incline Village, NV (US) 89451

( * ) Notice: Subject to any disclaimer, the term of this patent is extended or adjusted under 35 U.S.C. 154(b) by 1303 days.

(21) Appl. No.: 08/824,496

(22) Filed: Mar. 14, 1997

Related U.S. Application Data

(60) Provisional application No. 60/013,545, filed on Mar. 14, 1996.

(51) Int. Cl.
*H04B 15/00* (2006.01)

(52) U.S. Cl. .................. 381/94.1; 381/94.7; 381/94.9; 379/406.01; 379/406.08

(58) Field of Classification Search ............... 381/94.1, 381/94.7, 94.9, 66; 455/571; 379/406.01, 379/406.08, 406.05
See application file for complete search history.

(56) References Cited

U.S. PATENT DOCUMENTS 4,025,724 A * 5/1977 Davidson ................. 381/71.13
4,268,727 A * 5/1981 Agrawal .................. 179/170.2
4,589,137 A * 5/1986 Miller ....................... 381/94.7
4,649,505 A * 3/1987 Zinser ....................... 381/94.7
5,471,538 A * 11/1995 Sasaki ......................... 381/91
5,473,702 A * 12/1995 Yoshida ..................... 381/94.7
5,636,323 A * 6/1997 Umemoto .................... 381/66

FOREIGN PATENT DOCUMENTS

GB 2269968 2/1994
JP 0170298 * 10/1983 ................. 381/93

OTHER PUBLICATIONS

Kuo, "Active Noise Control System", 1996, pp. 35-36.*
"The Phase Correlation Image Alignment Method" IEEE Int'n'l Conf. Cybernetics & Society (Sep. 1975):163-165, C.D. Kuglin and D.C. Hines.

* cited by examiner

*Primary Examiner*—Vivian Chin
*Assistant Examiner*—Justin Michalski

(57) ABSTRACT

The present invention provides a cancellation signal which may be combined with a radio or television program signal to provide a mix minus signal for use in IFB communication with the talent. A cancellation signal circuit is responsive to a talent signal to delay and gain adjust the talent signal to provide the cancellation signal. The amount of gain and delay necessary may be adjusted by an operator, or automatically determined or set in response to the program signal or the mix minus signal. Automatic operation is provided even in the presence of changing delay and amplitude of the program signal or the talent signal component thereof.

53 Claims, 3 Drawing Sheets

IFB SYSTEM APPARATUS AND METHOD

The present application claims the benefit of U.S. provisional application Ser. No. 60/013,545 filed Mar. 14, 1996 which application is incorporated herein by reference.

BACKGROUND OF THE INVENTION

The invention relates to the use of Interrupted Feed Back (IFB) systems in production of television and radio like programs. The invention shows a method of reducing or removing annoying delayed versions of the talent audio signals from the communication link from the program director back to the talent (IFB). In a common application of the invention, the delayed version of the talent's voice can be removed from the program audio which is mixed with the director's voice instructions to be fed back to the talent's headset. Other uses and purposes for the present invention will also become known to one skilled in the art from the teachings herein.

1. Field of the Invention

This invention relates to the field of audibly communicating with remotely located actors and reporters in radio and television systems.

2. Description of the Prior Art

In the Prior art it is known to provide audible communications from a director who is physically located at a television or radio station to the talent (a reporter or actor) who is physically located at a remote site. Such communications are desired to contain both the director's voice instructions to the talent and the program audio. The program audio which is sent back to the talent is intended to not include the talent's voice (commonly called mix minus) but otherwise is the program as it is broadcast from or stored at the facility. This IFB audio allows the talent to both hear the director's instructions, for example to get ready for joining the broadcast "live" and to hear the other actors voices, for example so they can directly respond to questions. Examples of these situations are often seen on local news programs where a reporter at a remote news location joins the news broadcast and converses with the news anchors at the station.

Generating the mix minus audio is performed in parallel with generating the normal program audio, thus two separate mixing facilities are required. Such system allows the talent to hear both the director's instructions and the program audio, without the annoying effect of hearing his own voice. Such systems are called IFB systems (interrupted feed back). It is important that the talent not hear his own voice, as this is disconcerting and makes it difficult for the talent to speak.

Unfortunately, at times it is inconvenient or impossible to create the mix minus version of the program audio in which the reporter's voice is absent but all other audio content is present. In these situations, the regular program (with the reporter's voice) is sent over the IFB channel. This causes an annoyance to the reporter, especially when there is a significant delay in his voice. These situations often happen when the station runs out of space on its audio mix board, or a news event happens suddenly and there is no time to set up a mix minus or IFB link to the reporter.

FIG. 1 shows an example of the prior art in which the invention finds use. FIG. 1 represents a television or radio production system in which a talent is located some distance from a station. The talent speaks into a microphone 10 and the audio signal from 10 is amplified and sent back to the station over a return microwave or satellite link via an ENG truck 11, transmitter 19, and microwave receiver 3. There is frequently some delay involved in this return link, especially when it is via satellite. This delay is one cause of the problems which the present invention addresses. At the station the talent's audio is mixed into an audio program in a mix board 4. The program audio is then passed through a delay 5 to the program transmitter 17, recorder and/or other use. This delay is another cause of the problems which the present invention addresses. The FIG. 1 system demonstrates the case where there is no separate mix-minus signal generated to feed the IFB return.

If there were a separate mix-minus signal generated, a separate mix board 4 would mix all of the program audio, the same as 4, except it would not mix the talent audio from 3. This mix minus signal would be coupled to the switch instead of the program audio. The program or IFB signal or a signal similar to the program or IFB which is fed back to the talent will be referred to herein as the feedback signal. The feedback signal is that signal from which the talent signal is removed to provide the mix minus signal, and may or may not have the director's voice or other nonprogram signals mixed in.

The IFB signal shown in FIG. 1 is simply the program audio (containing the talent's delayed voice) with the director's voice instructions switched in at the director's discretion. This IFB is then transmitted back to the talent's headset 9 via IFB transmitter 6 and IFB receiver 18. In this fashion the talent can both receive instructions from the director, and listen to the program audio to receive appropriate time cues and possibly to carry on conversations with another talent. It might be noted that in some instances, even the IFB link is not available and the talent must operate solely by receiving the program broadcast from 17.

OBJECTS OF THE INVENTION

The invention described herein provides for a system of removing a first known signal from a second signal to provide a third signal.

A further object of the invention is to provide an improved IFB type system in which objectionable delayed audio is reduced or eliminated in the program audio feedback to the talent.

Another object of the invention is to provide an IFB like system in which a compensating delay is adjusted in order to provide a properly timed cancellation signal.

Yet another object of the invention is to provide an IFB like system in which a cancellation signal is adjusted in magnitude in order to provide a desired amount of cancellation.

Still another object of the invention is to provide a comparison of talent and program signal or mix minus signal in order to determine an amount of delay to be applied to a cancellation signal in an IFB like system.

Yet still another object of the invention is to provide a comparison of talent and program signal or mix minus signal in order to determine an amount of gain to be applied to the talent signal to generate a cancellation signal in an IFB like system.

A yet further object of the invention is to provide an inspection of a mix minus signal in order to control the gain to be applied to the talent signal thereby providing a cancellation signal in an IFB type system.

A still further object of the invention is to provide a comparison of a cancellation signal with at least one of a talent and program signals in order to determine an amount of gain to be applied to the talent signal to provide a cancellation signal in an IFB type system.

A yet still further object of the invention is to provide the above objects in electronic systems other than IFB types for example where signals other than voice are used or in other than television or radio applications.

Other objects and features of the invention will be apparent to one of ordinary skill in the art from the teachings herein.

DESCRIPTION OF THE PREFERRED EMBODIMENT

Figure 1:
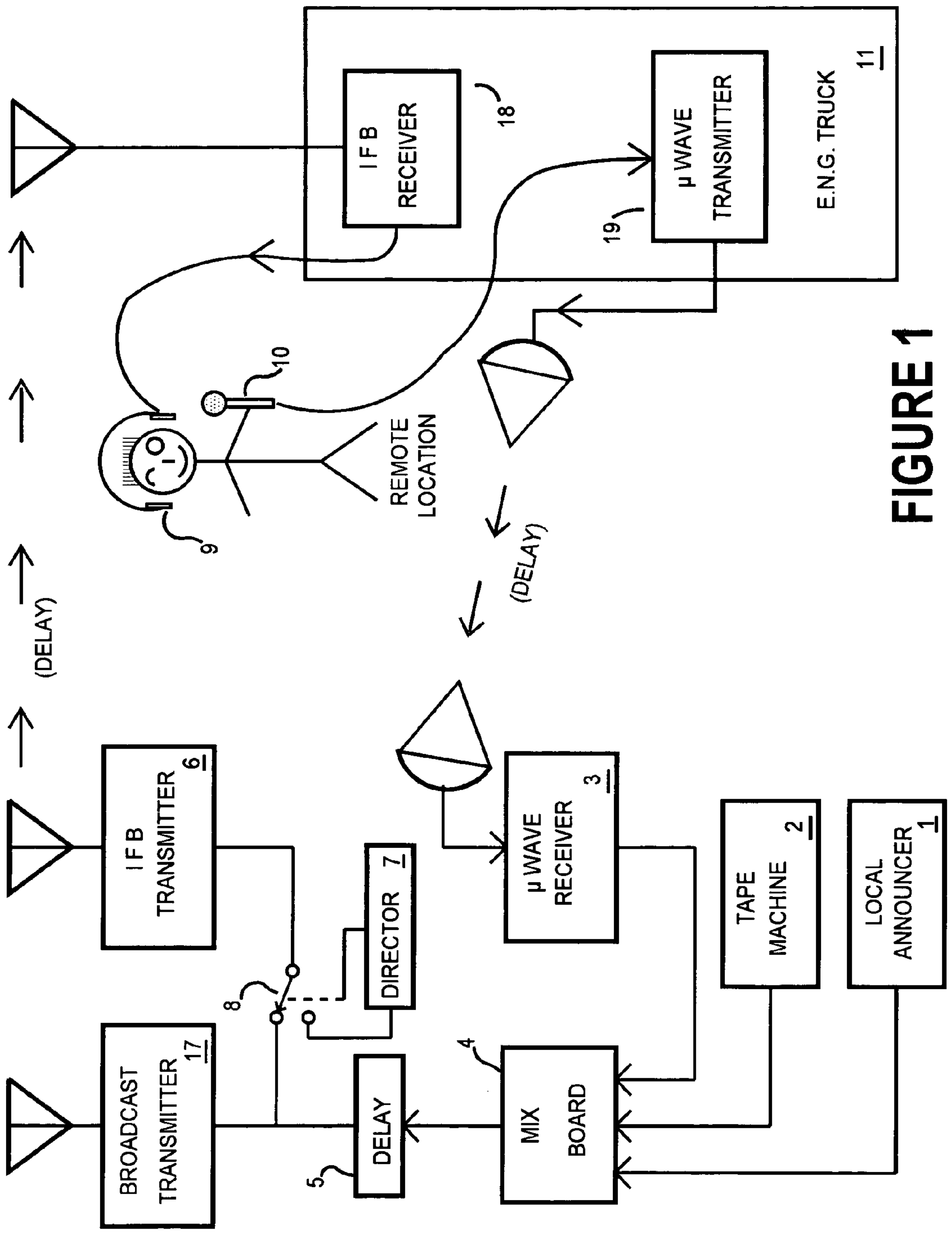
FIGURE 1 PRIOR ART
FIG. 1 is a drawing describing the prior art in which the invention finds use.

The description of the preferred embodiment of the invention and prior art is given by way of example of television and radio production. The terms which are used in the disclosure and claims are those normally used in the industry however they are intended to carry broader than normal meaning, such that they cover any applicable utilization of the invention. These terms include, but are not limited to: feedback signal, which is intended to be the program like or IFB like signal which is fed back to the talent; talent, which is intended to refer to the source of any electronic signal which is mixed with other electronic signals into a feedback electronic signal; talent signal, which is intended to refer to any electronic signal which is mixed with other electronic signals into a program electronic signal and if not the same the feedback signal; program or program signal, which is intended to refer to a mixture of electronic signals including the talent signal which is recorded or broadcast; mix minus or mix minus signal, the approximation of the program signal without the talent signal; cancellation signal, a signal (in delayed or undelayed form) which may be combined with the program signal to provide the mix minus signal.

The present invention may be utilized to create a mix minus program audio by inverting and delaying the talent's audio to create a cancellation signal which is combined with the program audio thus canceling out the talent's audio create the mix minus audio.

The invention provides a mix minus signal from a program signal and a talent signal, the invention including a cancellation signal circuit responsive to the talent signal to delay, gain adjust (including phase adjust) the talent signal in variable delay and gain adjust circuits to provide a cancellation signal. The amount of delay and gain may be set by an operator, but is preferred to be responsive to the mix minus signal or said program signal to provide a cancellation signal. When responsive to the mix minus signal, the circuit is preferred to automatically operate to minimize the talent signal component of the mix minus signal. When responsive to the program signal, the circuit is preferred to automatically operate to determine the talent signal component of the program signal and adjust the cancellation signal to match in amplitude and delay, with opposite polarity to provide cancellation.

The invention may be responsive to both program and mix minus signals, for example to determine delay in response to one and amplitude in response to the other. It is also preferred that the unmixed talent signal be utilized in determining the delay and amplitude of the cancellation signal, since it defines the portion of the program signal which is to be removed. The use of this talent signal in these determinations is not always necessary however, as will be understood from the teachings herein.

A combining circuit combines the program signal and the cancellation signal to provide the mix minus signal. If the delay and gain are responsive to the program signal, the amount of delay and gain necessary to match the talent signal content of the program signal is computed and the delay and gain set accordingly. If the delay and gain are responsive to the mix minus signal, the amount of residual talent signal content of the program signal is computed and the necessary change in delay and/or gain made accordingly. In either case, the gain of the gain stage may be positive or negative in order to provide cancellation. It is of course possible to make the delay stage responsive to one of the program signal or mix minus signal, and the gain stage responsive to the other.

It is preferred to utilize the talent signal along with one of the program signal or mix minus signal in order to simplify the determination of the amounts of delay and gain needed. It will be recognized however that the determination may be made solely by inspection of the mix minus signal, Or if the character of the program signal permits (for example if it only contains talent signal during certain intervals) that adjustment of gain and delay may be made solely in response to inspection of the mix minus or program signal. This is possible because optimum cancellation of the talent signal from the program signal leaves a minimum energy mix minus signal. Anything less than optimum cancellation leaves either some cancellation signal (over cancellation) or talent signal (under cancellation). Either condition may be detected and appropriate adjustment of gain and delay made. If the program signal is known to contain only talent signal for certain intervals, the level and delay of the talent signal therein may be computed by inspection of only the program signal, and the amount of necessary delay and gain determined therefrom.

While it is normal that the distances involved in IFB systems are in the order of miles, it will be appreciated that the invention finds use without respect to the distance involved, and thus the distance may just as well be feet, especially in situations where delay 5 is of significant size. In particular, the invention finds usefulness in overcoming problems with delays, which delays are sometimes, but not always, a consequence of the distance involved.

There are many applications where significant audio delays are involved without any significant distances, and the invention will find use in these applications as well. As an example of a use for the particular invention, a mix minus signal can be generated from the program signal by removing the talent's voice, thus eliminating the need for a separate mix minus mixer and transmission.

One application where delays, but not distance, are a problem is in virtual studios. In these studios the talent is televised in front of a chroma key blue screen, with a background electronically inserted behind the talent. A simple version is this system is used to insert weather maps behind weather forecasters. In more complex systems, the insertion of the background is made to track camera movement by use of substantial amounts of motion detection algorithms and other digital signal processing (DSP) operating on the video signal from the camera(s) which are televising the talent. The DSP processing of the video signal creates a substantial video delay, which with today's technology is in the order of 10 frames of video or ⅓ second. In order to keep the talent's speech in sync with his visual motion, a compensating audio delay is introduced into the talent's microphone audio. The talent's delayed audio is then used in an IFB system, causing the problems which are the subject of the present invention.

Again referring to FIG. 1, in the remote location, the talent wears a headset 9 or other suitable means for conveying messages, preferably audio in nature, back to the talent. In some instances, part of the feedback is via tone or vibration, for example such as with common pagers. The feedback allows the talent to listen to (or respond to) the various audio program material which originates at the originating station, as well as hearing his own voice if program audio is utilized instead of mix minus program. For example, such audio material may include a local station announcer 1 which may introduce or carry on a conversation with the remote location talent and tape recorded material 2 such as commercials. The program material is mixed in a mix board 4, passed through a delay 5 which may be almost negligible or may be of significant length, and passed through an IFB (feedback) transmitter 6 and receiver 18, or via other suitable means back to the ENG (Electronic News Gathering) truck 11. The ENG truck receives the transmitted audio signal from 6 with receiver 18 and couples it to the announcer's headset 9 so that the announcer may carry on a conversation with the local announcer 1 or may hear when the station is in a commercial break and playing back a commercial 2. Frequently the return path from 6 to 18 also incorporates some delay which is also problematic.

It will be seen in FIG. 1 that the audio program material from 4 via 5 is also sent to the program transmitter 17, recorder and/or other use, most of which result in viewing by the public. In such systems there are instances when the director needs to speak to the talent without interrupting the feed to 17. In the system shown, it is possible for the director 7 to break into the audio signal which is being sent back to the talent over link 6–18, via switch 8 in order to give the talent instructions which are unheard by the public audience. This "interruption" of the audio being fed back to the talent is the source of the name of this prior art system "Interrupted Feed Back" or IFB.

It will be appreciated that it is also possible for the talent to listen directly to the publicly transmitted program from 17, eliminating the separate switch 8 and transmitter 6. In such case the ENG truck 11 would simply house a receiver 18 tuned to allow the transmitted signal from 17 to be coupled into the talent's headset 9. The invention disclosed herein will be useful for these and any other manner of feedback to the announcer, and coupling of the microphone 10 into the station, the inventive features being useful for any such system or situation.

A problem with these prior art systems originates in the delays of the various audio signals which are received from and fed back to the talent, and in particular the delays in his own voice as is passes from microphone 10 via ENG truck 11, microwave or satellite link transmitter 19 and receiver 3 mix board 4, delay 5, switch 8, transmitter 6 (or transmitter 17), receiver 18 in ENG truck 11 and headset 9 back to the announcer. In fact, any time the talent's voice is fed back (and possibly delayed) to the talent there is a problem, no matter what the mechanism or system. It is very disconcerting for the talent to hear himself talking at a significant loudness, and especially disconcerting to hear himself talking delayed, at any appreciable loudness. It is extremely difficult for a talent to perform effectively with this disconcerting situation present.

The present invention reduces or cures the above problems, and provides a mechanism for automatically compensating for delays and other variations in such systems. A feature of the invention described allows for adjusting the level of compensation according to the talent's preferences. A further feature of the invention allows for adjusting the level of compensation according to the amount of delay and/or the talent's preferences.

Figure 2:
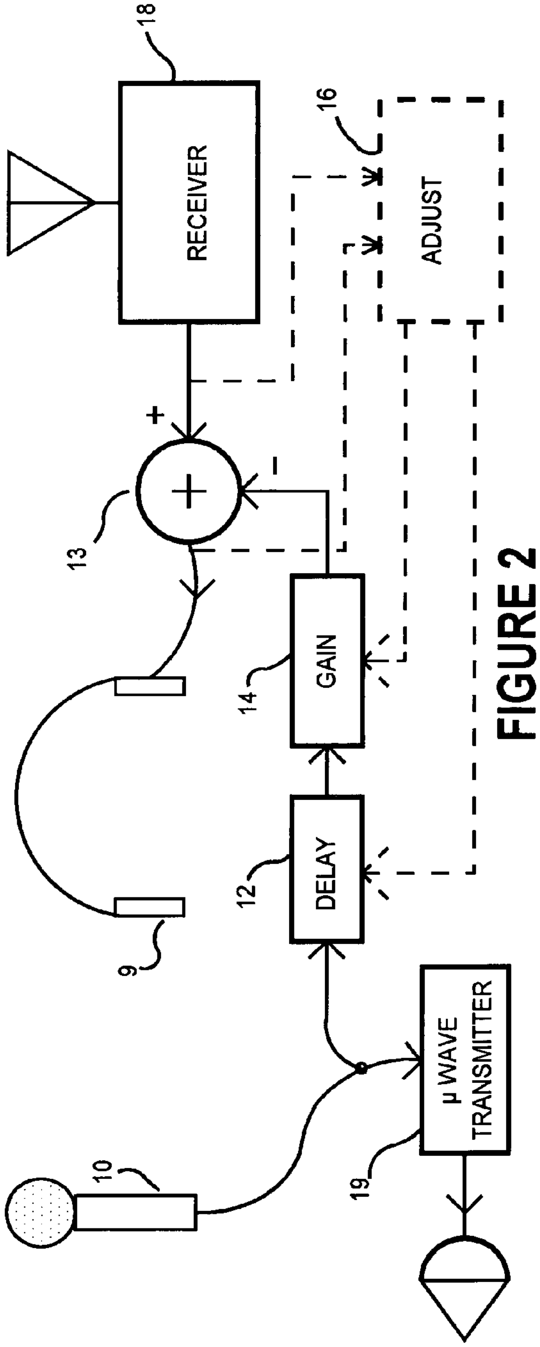
FIG. 2 is a drawing of a first embodiment of the invention.

FIG. 2 shows a first embodiment of the invention in which the sound from the talent's microphone 10 is delayed in a delay 12. Delay 12 is selected such that it matches, preferably closely, the delay which the talent's audio experiences in the loop to the station and back via the ENG truck to the headset 9. The gain or attenuation of the delayed audio is adjusted by a variable gain stage 14 such that when it is subtracted from the feedback audio from receiver 18 in a combiner 13 it reduces or cancels the delayed talent audio in the corrected audio which is coupled from 13 to the headphones 9.

It is preferred that variable delay 12 be continuously variable, that is that its delay may be changed without loss of any of the signal which is being delayed. In addition, it is preferred that the delay encompass pitch correction circuitry in order that the pitch of the signal being delayed remains constant as the delay is changing. It will be recognized that if the pitch is allowed to change during delay changes that no cancellation of the signal will take place in 13. For example if the delay is passing a 1000 Hz tone, and by the delay change the tone is changed to 1005 Hz, no cancellation of the 1000 Hz tone component in the feedback signal from 18 will be possible for the duration of the delay change. In addition, if the delay change is not continuous, the lost portions of signal in the delay will prevent cancellation of those portions in the feedback signal. Clearly, when the feedback signal's delay is constantly changing, the requirement for constant change of delay 12 would cause cancellation failure during that constant change. A suitable variable delay with pitch shifting is described in copending U.S. patent application Ser. No. 08/322,069 filed Oct. 12, 1994 now U.S. Pat. No. 5,920,842 issued Jul. 6, 1999.

In some instances the talent wishes to have full cancellation and in other instances the talent wishes to have only partial cancellation, depending on individual preferences. In order to accommodate the use of the system with different talents, an adjustment control 16 is provided to allow the amount of gain of 14, and hence the amount of cancellation of the talent's sound in the corrected feedback signal which is coupled from 13 to 9.

While the delay 12 is preferred to exactly match the delay which the talent's audio experiences in the loop to the station and back to the ENG truck, it will be recognized that any delay amount, up to double what is the actual amount, will provide some cancellation. The delay may thus be fixed at the expected delay and will be useful without adjustment. If the delay is double the actual delay or more, then the cancellation attempt will create an echo effect, which may be desirable to some particular talent, but is generally considered by the inventor to be unsuitable. It should be remembered however that the invention is intended for the convenience of the talent and if he wants a particular delay value or cancellation setting 16 it should be utilized.

The delay 12 of FIG. 2 is preferred to be adjustable by the talent or other operator. Adjustment may simply be made by setting the gain of 14 to some value which is expected to be about 90% of that necessary for proper cancellation, and experimentally increasing and decreasing the delay length to find maximum cancellation. This procedure may be easily accomplished with an audio delay of the type which has one or two controls which simply cause increase or decrease of the delay. Such a delay is the AD2100 available from Pixel Instruments Corp. of Los Gatos, Calif. 95030. After the delay is set, variable gain 14 is then adjusted for the proper level of cancellation desired by the talent. It should be noted that gain circuit 14 may incorporate phase adjustment as well in order to couple the proper phase of the canceling signal into 13. Such phase adjustment, and the need therefore, will be well understood from the teachings herein, and the practitioner of ordinary skill in the art will be capable of providing such operation from these teachings.

In some instances the delays and/or gains necessary to achieve high levels of cancellation are variable, sometimes constantly. In these instances it is preferred to inspect either the IFB (or program) audio from 18, or the mix minus audio from 13 with the adjustment circuit 16, thus allowing adjustment of the delay 12 and/or gain 14 automatically in response to the signal(s). The inventive concepts of performing automatic adjustment will be described in more detail with respect to the preferred embodiment of FIG. 3.

Figure 3:
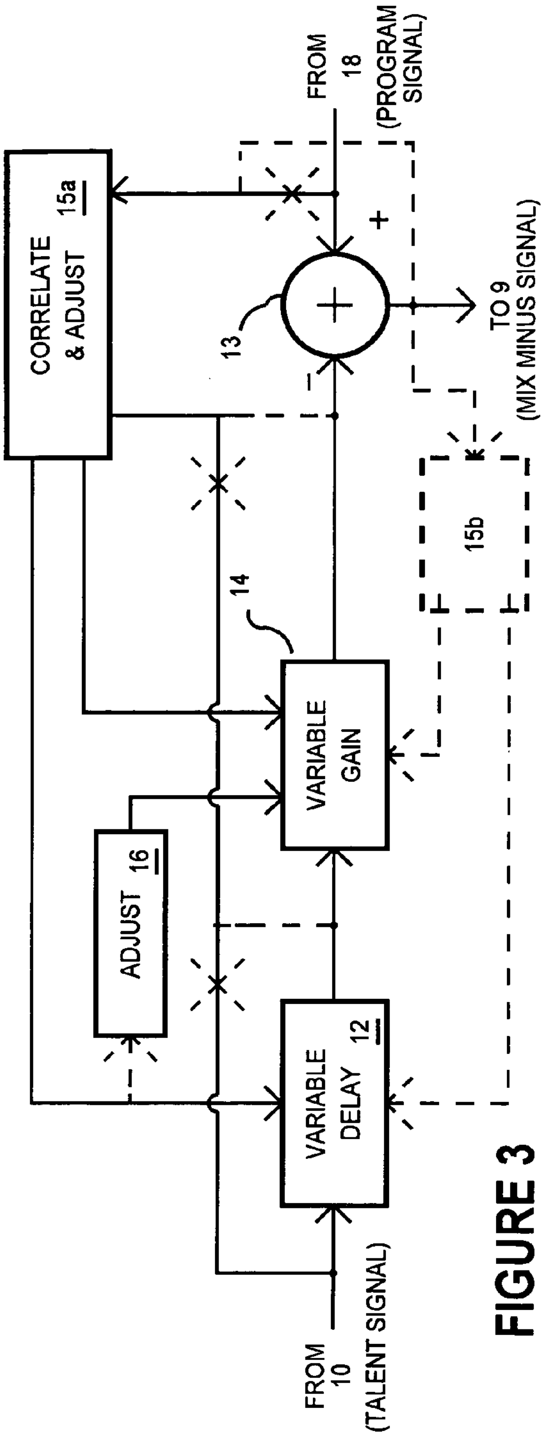
FIG. 3 is a drawing of a second embodiment of the invention.

FIG. 3 shows the preferred embodiment of the invention in which the adjustment of the variable delay 12 and/or variable gain 14 are made automatically or semi automatically to facilitate setup at a particular location and tracking as the delay which the talent's audio experiences in the loop to the station and back to the ENG truck changes. The latter is of particular significance in situations where the audio is fed back to the station via satellite.

While it is generally assumed that geosynchronous satellites are stationary, such is actually not the case. Geosynchronous satellites generally wander about the heavens in a FIG. 8 pattern, and sometimes wander away from their appointed positions requiring correction with small onboard rocket motors. Such wanderings constantly change the path length to and from the satellite, and the changing path length causes the delay to change.

Additionally, especially in television stations, a video signal is transmitted back from the ENG truck to the station. At the station, the video signal is delayed by one or more variable delays including video frame synchronizers. This video delay requires the use of a compensating audio delay to keep the audio and video synchronized. Such a compensating audio delay is taught in U.S. Pat. No. 4,313,135 which is incorporated herein by reference with respect to its prior art teachings.

The compensating audio delay may be thought of as being included in delay 5, as may any other delay which occurs in the system.

The circuit of FIG. 3 shows inspection, for this example by correlation, and adjustment circuit 15*a* which operates to correlate the talent's microphone audio from 10 with the feedback audio (IFB or program) from 18 to determine the amount of delay of the talent audio contained in the signal at 18 and the necessary gain correction to provide the proper level of cancellation signal for the desired cancellation as established by 16. Alternatively the adjustment of 12 and/or 14 may be performed in response to the inspection of the mix minus signal from 13 as is performed by 15*b*. Inspection circuits such as for example correlation circuits suitable for such use are known to those of ordinary skill in the art, for example as disclosed in U.S. Patent Re. 33,535 (U.S. Pat. No. 4,703,355). The circuit of FIG. 11 of this patent is of particular interest.

Correlate and adjustment circuit 15*a* provides inspection of the program signal from 18 or alternatively of the mix minus signal from 13 to provide proper control signals coupled to variable delay 12 and variable gain (and/or attenuation) circuit 14 in order to establish the proper delayed and amplitude correction signal to be coupled to 13. It is noted that such inspection is preferred to be facilitated by also inspecting the talent signal from 10 in either delayed or undelayed form, and gain adjusted or unadjusted form as shown by the dashed connections. For example, correlation of the program signal from 18 and undelayed talent signal from 10 may be utilized to determine the proper delay, and inspection of the mix minus signal in response to the delayed talent from 14 used to determine the proper gain setting of 14.

Suitable variable audio delays are described in U.S. Pat. No. 4,313,135 and U.S. Patent Re. 33,535. The circuit of FIG. 12 of the '535 patent is a particularly suitable variable audio delay which may be utilized. In addition, the aforementioned Pixel Instruments AD 2100 is capable of variable delay under control of 15. It is preferred that 15 operate continuously and automatically in order that changing delays and amplitudes in the loop back to the talent will be automatically compensated thus maintaining a consistent level of cancellation in the IFB audio signal which is fed back to the talent from 13.

Figure 4:
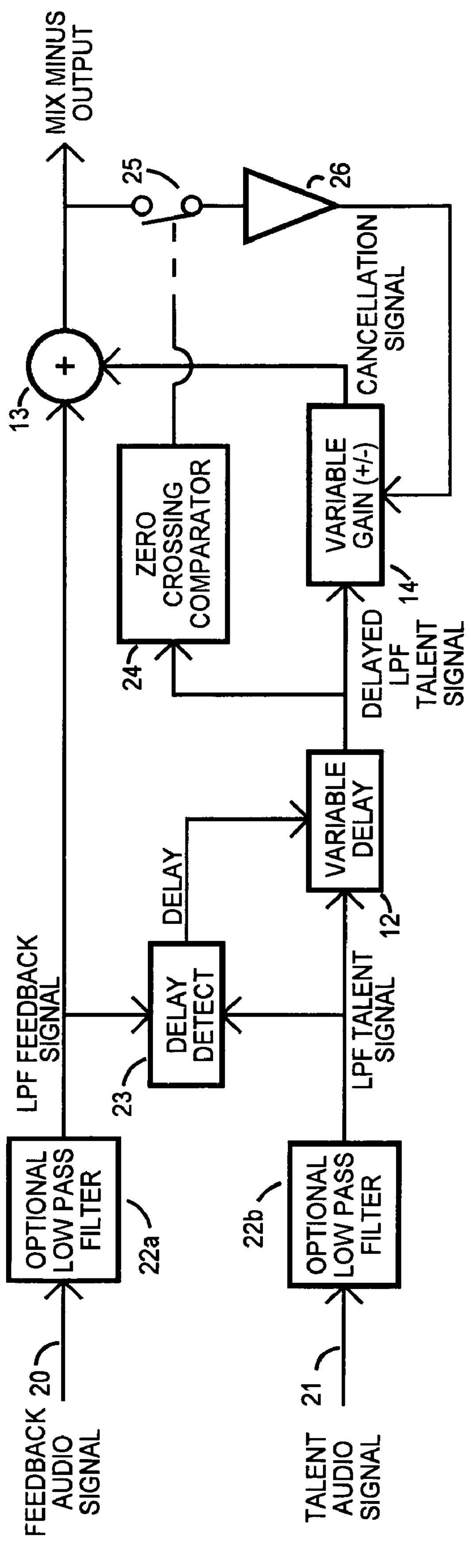
FIG. 4 is a drawing of the preferred embodiment of the invention.

FIG. 4 shows the preferred embodiment of the invention as used with radio and television program production. The feedback audio signal, which for example may be the program audio signal which is received off the air, is input at 20. The talent audio signal from the talent is input at 21. Both signals are preferred to be low pass filtered to the same bandwidth of 3.5 KHz by 21 a and b to remove noise and to reduce sampling requirements for the variable delay 12, however this is optional. The LPF filtered feedback and LPF filtered talent signals are coupled to a delay detector 23, for example such as is described in the aforementioned U.S. Patent Re. 33,535 which delay detector measures the delay of the talent signal component of the LPF feedback signal with respect to the LPF talent signal.

The delay measure is coupled to variable delay 12 to delay the LPF talent signal by an amount which matches the delay of the talent signal component of the LPF feedback signal. The delayed LPF talent signal from 12 is coupled to a zero crossing comparator 24 and a variable gain circuit 14. The zero crossing comparator outputs a logic high signal when the delayed LPF talent signal is positive. This logic signal is coupled to switch 25 which operates as a sampling circuit to pass the mix minus signal from 13 to an error integrator 25. Since the program portion of the LPF feedback signal is random with respect to the closing of 25, it will integrate to zero in 24. The talent signal component of the LPF feedback signal will be the same polarity, positive or negative whenever the switch is closed. Assuming that the variable gain is insufficient to achieve proper cancellation of the talent signal component in 13, the positive residual component will charge the integrator 26 more positive thus increasing the gain. The charging will continue until a zero residual component is reached, at which time the integrator will no longer be charged and will hold that value which is necessary for cancellation. Any change in the amplitude of the talent signal component of the LPF feedback signal will thus be automatically compensated.

If the phase of the talent signal component of the LPF feedback signal should change, or initially be negative, the integrator 26 will charge negative until a negative output is achieved. At that time the variable gain will change from positive to inverting, thus providing the proper phase cancellation signal. As above, the integrator will continue to charge until a proper cancellation is achieved resulting in no residual error. While the above described methods of adjusting delay in 12 and gain in 14 is preferred, one of ordinary skill in the art will be able to adapt other circuits and techniques for the same purpose, but tailored to different applications and levels of performance from the teachings herein. For example, the gain setting circuit may include a synchronous detector, multiplier or mixer along with appropriate filtering of the output for coupling to the gain circuit 14.

While elements 12–16 are shown in their preferred location in the ENG truck 11, one of ordinary skill in the art will recognize from the teachings herein that they may be physically and electrically located separately or together anywhere in the system as long as they perform the function of providing suitable cancellation of an unwanted talent audio signal. In addition, it will also be recognized from the teachings herein that the connection of these various elements may be interchanged as desired to optimize the system for lower cost or higher performance or both. In particular the locations of the variable delay 12 and variable gain 14 may be interchanged.

The correlation 15*a* may operate with the feedback audio from 18 in either regular form from 18 or in mix minus form from 13. Comparison by 15 may also operate with the talent's audio directly from microphone 10 or after that audio has been delayed by 12 or after both delay and gain adjustment by 12 and 14, or after gain adjustment 14 only if 12 and 14 are swapped. It is also possible that the comparison may operate only with the mix minus audio from 13 receiving the talent audio and feedback audio after correction, without any direct connection to 10 (or 12 or 14) or the signal from 6, as is shown by 15*b*. Combinations of these various connections may be utilized as well in order to tailor the operation of the invention to particular system needs.

Manual cancellation adjustment 16 is preferred to be operated by the talent or other operator, and may also be responsive to the delay from 15*a* (or 15*b*). It will be noted that while some talents like a small amount of feedback of their own voice if the delay is small, most prefer total cancellation of their own voice if the delay increases. By coupling 16 to the delay control from 15, it is possible to provide this feature.

The invention described herein by way of explanation of the preferred embodiment may be practiced with numerous changes in the arrangement, structure and combination of the individual elements, as well as with substitution of equivalent functions and circuits for the elements in order to optimize the invention for a particular application, all without departing from the scope and spirit of the invention as described herein.

What is claimed is:

1. A system for providing a mix minus signal from a delayed feedback signal and a relatively undelayed talent signal including in combination:

a cancellation circuit responsive to said talent signal to delay said talent signal in a variable delay and to gain adjust said talent signal in delayed or undelayed form in a variable gain circuit thereby providing a cancellation signal, with the amount of said delay or gain responsive to human operator adjustment;

said feedback signal and said cancellation signal being applied to a combining circuit to provide said mix minus signal with said feedback signal being applied without the use of a variable delay circuit.

2. A system for providing a mix minus signal from a delayed feedback signal and a relatively undelayed talent signal including in combination:

a cancellation circuit responsive to said talent signal to delay said talent signal in a variable delay and to gain adjust said talent signal in delayed or undelayed form in a variable gain circuit thereby providing a cancellation signal, with the amount of at least one of said delay or gain responsive to said mix minus signal or said feedback signal or both;

said feedback signal and said cancellation signal being applied to a combining circuit to provide said mix minus signal with said feedback signal being applied without the use of a variable delay circuit.

3. A system for providing a mix minus signal from a delayed feedback signal and a talent signal including in combination:

a cancellation circuit responsive to said talent signal to delay said talent signal in a variable delay and to gain adjust said talent signal in delayed or undelayed form in a variable gain circuit thereby providing a cancellation signal, with the amount of said delay and gain automatically responsive to at least one of said mix minus signal and said feedback signal and;

said feedback signal and said cancellation signal being applied to a combining circuit to provide said mix minus signal with said feedback signal being applied without the use of a variable delay circuit.

4. A system as claimed in claim 1, 2 or 3 wherein said amount of said delay is responsive to said feedback signal and the amount of said gain is responsive to said mix minus signal.

5. A system as claimed in claim 1, 2 or 3 wherein said amount of said delay is responsive to said mix minus signal and the amount of said gain is responsive to said feedback signal.

6. A system as claimed in claim 1, 2 or 3 wherein said amount of said delay and said amount of said gain is responsive to said feedback signal.

7. A system as claimed in claim 1, 2 or 3 wherein said amount of said delay and said amount of said gain is responsive to said mix minus signal.

8. A system as claimed in claim 1, 2 or 3 wherein at least one of said amount of said delay and said amount of said gain is responsive to a correlation of said mix minus signal and said talent signal wherein said talent signal is in delayed form.

9. A system as claimed in claim 1, 2 or 3 wherein at least one of said amount of said delay and said amount of said gain is responsive to a correlation of said feedback signal and said talent signal wherein said talent signal is in delayed form.

10. A system as claimed in claim 1, 2 or 3 wherein at least one of said amount of said delay and said amount of said gain is responsive to a correlation of said mix minus signal and said talent signal wherein said talent signal is in undelayed form.

11. A system as claimed in claim 1, 2 or 3 wherein at least one of said amount of said delay and said amount of said gain is responsive to a correlation of said feedback signal and said talent signal wherein said talent signal is in undelayed form.

12. A system as claimed in claim 1, 2 or 3 wherein at least one of said amount of said delay and said amount of said gain is responsive to a correlation of said mix minus signal and said talent signal wherein said talent signal has been gain adjusted in said variable gain circuit.

13. A system as claimed in claim 1, 2 or 3 wherein at least one of said amount of said delay and said amount of said gain is responsive to a correlation of said feedback signal and said talent signal wherein said talent signal has been gain adjusted in said variable gain circuit.

14. A system as claimed in claim 1, 2 or 3 wherein at least one of said amount of said delay and said amount of said gain is responsive to a correlation of said mix minus signal and said talent signal wherein said talent signal has been gain adjusted in said variable gain circuit.

15. A system as claimed in claim 1, 2 or 3 wherein at least one of said amount of said delay and said amount of said gain is responsive to a correlation of said feedback signal and said talent signal wherein said talent signal has been gain adjusted in said variable gain circuit.

16. A system as claimed in claim 1, 2 or 3 wherein at least one of said amount of said delay and said amount of said gain is responsive to a correlation of said feedback signal and said cancellation signal.

17. A system as claimed in claim 1, 2 or 3 wherein at least one of said amount of said delay and said amount of said gain is responsive to a correlation of said mix minus signal and said cancellation signal.

18. A system as claimed in claim 1, 2 or 3 wherein said delay is automatically adjustable in response to changes in relative delay of said talent signal and the talent signal component of said feedback signal.

19. A system as claimed in claim 1, 2 or 3 wherein said delay is automatically adjusted in response to comparison of said feedback signal and said talent signal in undelayed form, and said gain is automatically adjusted in response to said mix minus signal and said talent signal in delayed form.

20. A method for providing a mix minus signal from a talent signal and a feedback signal having a variable amount of delay arising from its passage through a broadcast transmission including the steps of:

a) delaying said talent signal by a varying delay amount in response to said variable amount of delay;

b) providing a cancellation signal of a known level in response to said delayed talent signal;

c) changing said varying delay amount of said delay in step a) from time to time;

d) combining said feedback signal and said cancellation signal to provide said mix minus signal wherein said feedback signal is combined without additional variable delay beyond said variable amount.

21. A method of providing a mix minus signal from a feedback signal and a talent signal which have a variable relative timing arising from a broadcast transmission, including the steps of:

a) delaying said talent signal by a varying delay amount in response to said varying relative timing;

b) adjusting the level of said talent signal in delayed or undelayed form and providing a cancellation signal in response to the delayed form thereof;

c) in said delaying step a) or said adjusting step b) or both, changing the amount of at least one of said varying delay amount or said level in responsive to said mix minus signal or said feedback signal or both;

d) providing said mix minus signal in response to said feedback signal and said cancellation signal wherein said feedback signal receives no variable delay beyond that as part of said broadcast transmission.

22. A method for providing a mix minus signal from a feedback signal from a broadcast transmission and a talent signal said signals having a relative delay which may vary due to said broadcast transmission, including the steps of:

a) delaying said talent signal by an varying delay amount responsive to said relative delay which may vary;

b) adjusting the level of said talent signal in delayed or undelayed form in a variable gain circuit and providing a cancellation signal in response to the delayed version thereof;

c) wherein in step a) said varying delay amount and in step b) said level are automatically responsive to at least one of said mix minus signal and said feedback signal and;

d) providing said mix minus signal in response to said feedback signal and said cancellation signal wherein said feedback signal suffers no variable delay beyond that as part of said broadcast transmission.

23. A method as claimed in claim 20, 21 or 22 wherein said varying delay amount of step a) is responsive to said feedback signal and said level of step b) is responsive to said mix minus signal.

24. A method as claimed in claim 20, 21 or 22 wherein said varying delay amount of step a) is responsive to said mix minus signal and said level of step b) is responsive to said feedback signal.

25. A method as claimed in claim 20, 21 or 22 wherein said varying delay amount of step a) and said level of step b) is responsive to said feedback signal.

26. A method as claimed in claim 20, 21 or 22 wherein said varying delay amount of step a) and said level of step b) is responsive to said mix minus signal.

27. A method as claimed in claim 20, 21 or 22 wherein at least one of said varying delay amount of step a) and said level of step b) is responsive to said talent signal in delayed form.

28. A method as claimed in claim 20, 21 or 22 wherein at least one of said varying delay amount of step a) and said level of step b) is responsive to a correlation of said feedback signal and said talent signal wherein said talent signal is in delayed form.

29. A method as claimed in claim 20, 21 or 22 wherein at least one of said varying delay amount of step a) and said level of step b) is responsive to said mix minus signal and said talent signal in undelayed form.

30. A method as claimed in claim 20, 21 or 22 wherein at least one of said varying delay amount of step a) and said level of step b) is responsive to said feedback signal and said talent signal wherein said talent signal is in undelayed form.

31. A method as claimed in claim 20, 21 or 22 wherein at least one of said varying delay amount of step a) and said level of step b) is responsive to said mix minus signal and said talent signal wherein said talent signal has been gain adjusted in said step b).

32. A method as claimed in claim 20, 21 or 22 wherein at least one of said varying delay amount of step a) and said level of step b) is responsive to a correlation of said feedback signal and said talent signal wherein said talent signal has been gain adjusted in said step b).

33. A method as claimed in claim 20, 21 or 22 wherein at least one of said varying delay amount of step a) and said level of step b) is responsive to a correlation of said mix minus signal and said talent signal wherein said talent signal has been gain adjusted in said step b).

34. A method as claimed in claim 20, 21 or 22 wherein at least one of said varying delay amount of step a) and said level of step b) is responsive to a correlation of said feedback signal and said talent signal wherein said talent signal has been gain adjusted in said step b).

35. A method as claimed in claim 20, 21 or 22 wherein at least one of said varying delay amount of step a) and said level of step b) is responsive to a correlation of said feedback signal and said cancellation signal.

36. A method as claimed in claim 20, 21 or 22 wherein at least one of said varying delay amount of step a) and said level of step b) is responsive to a correlation of said mix minus signal and said cancellation signal.

37. A method as claimed in claim 20, 21 or 22 wherein said varying delay amount of step a) is automatically adjustable in response to changes in relative delay of said talent signal and the talent signal component of said feedback signal.

38. A method as claimed in claim 20, 21 or 22 wherein said varying delay amount of step a) is automatically adjusted in response to comparison of said feedback signal and said talent signal in undelayed form, and said level of step b) is automatically adjusted in response to said mix minus signal and said talent signal in delayed form.

39. A method as claimed in claim 20, 21 or 22 wherein said delaying of step a) include pitch correction in order that the pitch of said talent signal remains constant as said delay is changed.

40. A system for providing a mix minus signal from a feedback signal having a relative delay with respect to a talent signal including in combination:

a cancellation circuit responsive to said talent signal to delay said talent signal in an amount set by a human operator and to gain adjust said talent signal in delayed or undelayed form in a variable gain circuit thereby providing a cancellation signal and;

a combining circuit responsive to said feedback signal and said cancellation signal to provide said mix minus signal.

41. A system as in claim 40 wherein said gain adjustment of said talent signal operates in a fashion such that said mix minus signal intentionally includes an audible residual amount of said talent signal.

42. A system as in claim 40 wherein said delay amount of said talent signal is automatically changed from said amount set by a human operator to the expected amount of said relative delay of said feedback signal with respect to said talent signal when said relative delay changes.

43. A system for providing a mix minus signal from a feedback signal delayed by a first amount relative to a talent signal including in combination:

a cancellation circuit responsive to said talent signal to delay said talent signal by an amount set by a human operator to the expected value of said first amount and to gain adjust said talent signal in delayed or undelayed form in a variable gain circuit thereby providing a cancellation signal and;

a combining circuit responsive to said feedback signal and said cancellation signal to provide said mix minus signal.

44. A system for providing a mix minus signal from a feedback signal delayed by a first amount relative to a talent signal including in combination:

a cancellation circuit responsive to said talent signal to delay said talent signal by an amount set by a human operator in response to the expected value of said first amount and to gain adjust said talent signal in delayed or undelayed form in a variable gain circuit thereby providing a cancellation signal, with the amount of said gain responsive to said mix minus signal or said feedback signal or both and;

a combining circuit responsive to said feedback signal and said cancellation signal to provide said mix minus signal.

45. A system as in claim 43 or 44 wherein said mix minus signal intentionally includes an audible residual amount of said talent signal which amount is responsive to human operator adjustment.

46. A method of providing a mix minus signal from a feedback signal which is delayed by a first amount and a talent signal including the steps of:

a) delaying said talent signal by an amount set by a human operator in response to the expected value of said first amount;

b) adjusting the level of said talent signal in delayed or undelayed form and providing a cancellation signal in response to the delayed form thereof and;

c) providing said mix minus signal in response to said feedback signal and said cancellation signal.

47. A method as in claim 46 wherein step b) or c) or both operate in a fashion such that said mix minus signal intentionally includes a residual audible amount of said talent signal.

48. A method as in claim 46 wherein step a) includes automatically changing the amount of delay of said talent signal from said amount set by said human operator to said first amount.

49. A method for providing a mix minus signal from a feedback signal delayed by a first amount and a talent signal including the steps of:

a) delaying said talent signal by an amount set by a human operator in response to the expected value of said first amount;

b) adjusting the level of said talent signal in delayed or undelayed form in a variable gain circuit and providing a cancellation signal in response to the delayed version thereof;

c) automatically varying said delay amount of step a) from said expected value to said first value and;

d) providing said mix minus signal in response to said feedback signal and said cancellation signal.

50. A method of providing a mix minus signal from a feedback signal delayed by a first amount and a talent signal including the steps of:

a) delaying said talent signal by a delay amount set by a human operator in response to the expected value of said first amount;

b) adjusting the level of said talent signal in delayed or undelayed form and providing a cancellation signal in response to the delayed form thereof;

c) in said delaying step a) or said adjusting step b) or both, automatically changing the amount of at least one of said delay amount or said level in responsive to at least one of said mix minus signal or said feedback signal and;

d) providing said mix minus signal in response to said feedback signal and said cancellation signal.

51. A method as in claim 49 or 50 wherein said mix minus signal intentionally includes a residual audible amount of said talent signal which amount is responsive to human operator adjustment.

52. A method as in claim 49 or 50 wherein in step c) includes automatically changing the amount of delay of said talent signal from said amount set by said human operator to said first amount after said delay of step a) is set by said human operator.

53. A method as in claim 49 or 50 wherein in step c) includes automatically changing the amount of delay of said talent signal from said amount set by said human operator to match said first amount in response to changes in said first amount.

* * * * *